Feb. 10, 1948.　　　　A. H. SMITH　　　　2,435,932
FISH LURE
Filed Jan. 26, 1945

Inventor
Arthur H. Smith

By
Glenn L. Fish
Attorney

Patented Feb. 10, 1948

2,435,932

UNITED STATES PATENT OFFICE 2,435,932

FISH LURE

Arthur H. Smith, Grandview, Wash.

Application January 26, 1945, Serial No. 574,653

1 Claim. (Cl. 43—42)

This invention relates to an artificial lure used for fishing and it is one object of the invention to provide a lure of such construction that it may function as a surface lure, a wooden plug, or a spoon fly.

Another object of the invention is to provide a lure having a buoyant body which is preferably formed of wood and of such shape that it has a concave under face curved longitudinally and transversely of the body and to which is secured a plate serving as a reflector for casting rays of light downwardly in water through which the lure is drawn when in use.

Another object of the invention is to provide the reflector plate with an extension at its front end which projects downwardly and forwardly from the body and the reflector plate and serves to impart darting movements to the lure as it is drawn forwardly through water.

Another object of the invention is to provide a lure which is simple in construction, cheap to manufacture, and very efficient in operation.

The invention is illustrated in the accompanying drawings, wherein.

Figure 1:
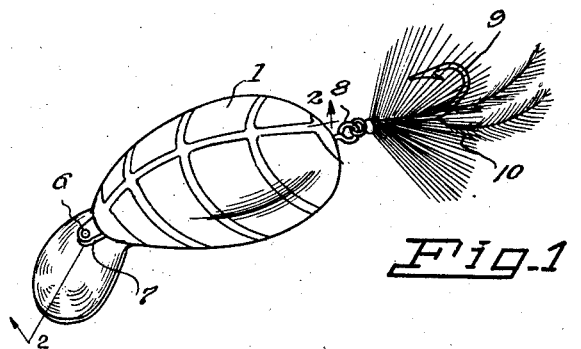
Fig. 1 is a perspective view of the improved lure.
Figure 2:
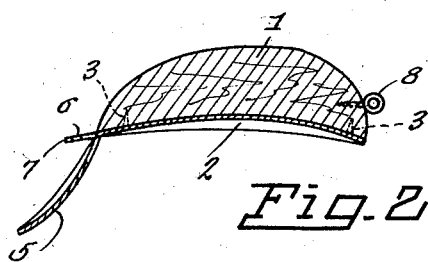
Fig. 2 is a sectional view taken longitudinally through the lure on the line 2—2 of Fig. 1.
Figure 4:
Fig. 4 is a sectional view taken transversely through the reflector plate on the line 4—4 of Fig. 3.
Figure 3:
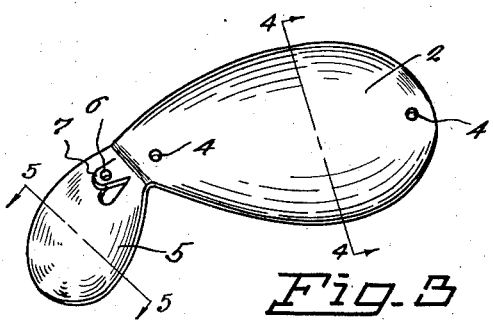
Fig. 3 is a perspective view of the reflector plate and its spoon.
Figure 5:
Fig. 5 is a sectional view taken transversely through the spoon on the line 5—5 of Fig. 3.

This improved artificial lure has a buoyant body 1 which has been shown formed of wood but may be formed of cork or as a hollow metal shell. This body has its upper surface curved longitudinally and transversely so that it may readily have longitudinal dipping and transverse rocking movement when drawn through water and its under face is arcuate longitudinally and transversely to provide the body with a concave surface against which is disposed a reflector plate 2 formed of polished metal and held in place by screws 3 which pass through openings 4 formed near the ends of the plate.

At its front end, the reflector plate 2 carries an extension 5 which projects forwardly at a downward incline and forms a tongue or spoon which is of concavo convex formation and curved longitudinally and transversely with its concave surface disposed upwardly. By so forming the tongue or spoon, diving and darting movements will be imparted to the lure when drawn through the water by a fishing line tied through the opening 6 at the front end of an ear 7 cut from the spoon or snout 5 midway the width of its rear end and projecting forwardly in the plane of the front end of the reflector plate 2. A screw eye 8 is screwed into the rear end of the body 1 for carrying a hook 9 equipped with feathers, hair, rubber strands or the like 10 and constituting a fly hook.

When the improved artificial lure is in use it is tied to a fishing line and a cast made in the usual manner. If retrieved with a uniform speed, the snout or spoon 5 pulls the plug beneath the surface of the water and causes it to move with a swimming action. This swimming action causes the plug or body 1 to tilt from side to side and the reflector plate throws rays of light downwardly into holes where fish are lurking, for attracting the fish. The depth at which the plug moves and the vigor of the swimming action will vary in accordance with the speed at which the line is pulled to retrieve the artificial bait. When not being held under water by pull upon the snout or spoon the plug will float on the surface of the water. By retrieving intermittently with a series of easy jerks, the bait can be used as a surface lure. When the line is jerked the plug or body will dive under the water and when pull is released it will bob back to the surface and dance around on riffles caused by the disturbance of the water. Motion of the body or plug causes the reflector plate to cast rays of light downwardly in various directions and attract the attention of deep lying fish to the lure.

The improved artificial lure combines all the features of a surface lure, an ordinary wooden plug, and a spoon fly combination. It will be understood that the artificial lure may be of any size desired according to the kind of fish to be caught and that the plug or body may be striped, as shown in Fig. 1, or painted various colors or combinations of colors. The fly hook will be of appropriate size and type and, by unscrewing the screw eye, other fly hooks equipped with screw eyes may be substituted in lieu of one already mounted at the rear end of the body.

What is claimed is:

An artificial lure comprising a buoyant body having its upper surface curved longitudinally and transversely for its entire length, the bottom surface of the body being concave and curved longitudinally and transversely, a concavo convex reflector plate mounted against the under face of said body and conforming to the shape and dimensions thereof, a substantially oval extension integral with the front end of said reflector plate and bent across its rear end and forming a spoon-shaped snout projecting forwardly at a downward incline and being concavo convex with its concave surface presented upwardly, a longitudinally extending line-engaging tongue struck from the rear portion of said extension midway the width thereof and projecting forwardly from the front end of the body, and a hook having a screw eye at its front end screwed into the rear end of the body.

ARTHUR H. SMITH.

REFERENCES CITED

The following references are of record in the file of this patent:

UNITED STATES PATENTS

| Number | Name | Date |
| --- | --- | --- |
| 2,295,765 | Weber | Sept. 15, 1942 |
| 1,624,116 | Putnam et al. | Apr. 12, 1927 |
| 1,526,713 | Lindberg | Feb. 17, 1925 |
| 1,309,966 | Sebenius | July 15, 1919 |
| 1,326,821 | Ackerman | Dec. 30, 1919 |
| 2,176,250 | DeLong | Oct. 17, 1939 |